United States Patent

[11] 3,542,474

| [72] | Inventor | Wallace Edward Brainard<br>New Berlin, Wisconsin |
|---|---|---|
| [21] | Appl. No. | 619,515 |
| [22] | Filed | Feb. 23, 1967 |
| [45] | Patented | Nov. 24, 1970 |
| [73] | Assignee | Kearney and Trecker Corporation<br>West Allis, Wisconsin<br>a corporation of Wisconsin |

[54] INTERFEROMETRIC MACHINE FOR MEASURING ANGULAR MOTION
14 Claims, 9 Drawing Figs.

| [52] | U.S. Cl. | 356/110 |
|---|---|---|
| [51] | Int. Cl. | G01b 9/02 |
| [50] | Field of Search | 356/106,<br>113, 138, 140 |

[56] References Cited
UNITED STATES PATENTS
3,085,466  4/1963  Hemstreet..................  356/110

*Primary Examiner*—Ronald L. Wibert
*Assistant Examiner*—Conrad Clark
*Attorney*—William C. Gleisner, Jr. and Donald E. Porter

ABSTRACT: This invention comprises an angular measurement apparatus for determining positional movement of a rotatable table indexable throughout a full 360°. To accomplish this, two rectilinear measuring devices are operatively interconnected between spaced apart portions of a support frame and a common reference member depending from the table for bodily rotational movement therewith. During rotation of the table, corresponding rotational movement of the common depending reference member actuates both rectilinear measuring devices, thereby providing measured linear motions which are the functions of the sine and cosine of an angle indicative of angular table position.

Patented Nov. 24, 1970

INVENTOR
WALLACE E. BRAINARD

ATTORNEY
William C. Gleisner Jr.

INVENTOR
WALLACE E. BRAINARD
ATTORNEY

INVENTOR
WALLACE E. BRAINARD

ATTORNEY
William C. Gleisner Jr.

INTERFEROMETRIC MACHINE FOR MEASURING ANGULAR MOTION

This invention relates to an interferometric measuring apparatus for measuring angular or circular motion.

A general object of the invention is to provide an improved apparatus for controlling movement of a rotatable index member with an extremely high degree of accuracy.

Another object is to provide plural laser interferometers respectively operative to measure different rectilinear distances to a common reference member depending from a rotatably indexable member, and being operative to control indexable movement of the member.

A further object is to provide a laser interferometric apparatus for controlling indexable movement of a machine tool member.

A further object of the invention is to greatly increase the accuracy of controlling the selected positional movement of an indexable member in response to a numerical control system.

According to this invention, a pair of laser interferometers are arranged to continuously measure separate rectilinear distances to a common reference member carried for bodily rotational movement by a rotatable worktable. To accomplish this, the worktable is journaled in a frame which pivotally supports a pair of vertically spaced beam projecting interferometers for individual pivotal movement about 90° spaced apart axes parallel to the table axis. Both of the laser interferometers are operative to project vertically spaced, parallel measuring beams toward the common reference member radially spaced from the axis of the worktable for rotational movement therewith. For returning the measuring beams, the reference member comprises a pair of vertically spaced, separate measuring beam reflectors respectively mounted for independent pivotal movement about a common axis parallel to the table axis and spaced radially therefrom. A separate alining or steering device is interconnected between each beam projecting interferometer and its cooperating beam reflector for maintaining predetermined angular alinement therebetween. During power driven rotational movement of the worktable, the interferometers operate to indicate the angular position of the worktable and to provide a feedback signal to a numerical control system for controlling movement thereof to a next selected indexed position.

The foregoing and other objects of the invention which will become more fully apparent from the following detailed description of apparatus exemplifying this invention, may be achieved by the particular interferometric index control system described herein as a preferred embodiment thereof in connection with the accompanying drawings, in which:

FIG. 5A illustrates the Logic Analysis effected during operation of the interferometers; and, FIG. 6 is a schematic block diagram illustrating in fragmentary form a numerical control system incorporating the angle measuring apparatus in the feedback loop of a numerical control system, i.e., comparing the actual angular position during indexable movement with the selected position required by numerical input data.

Figure 1:
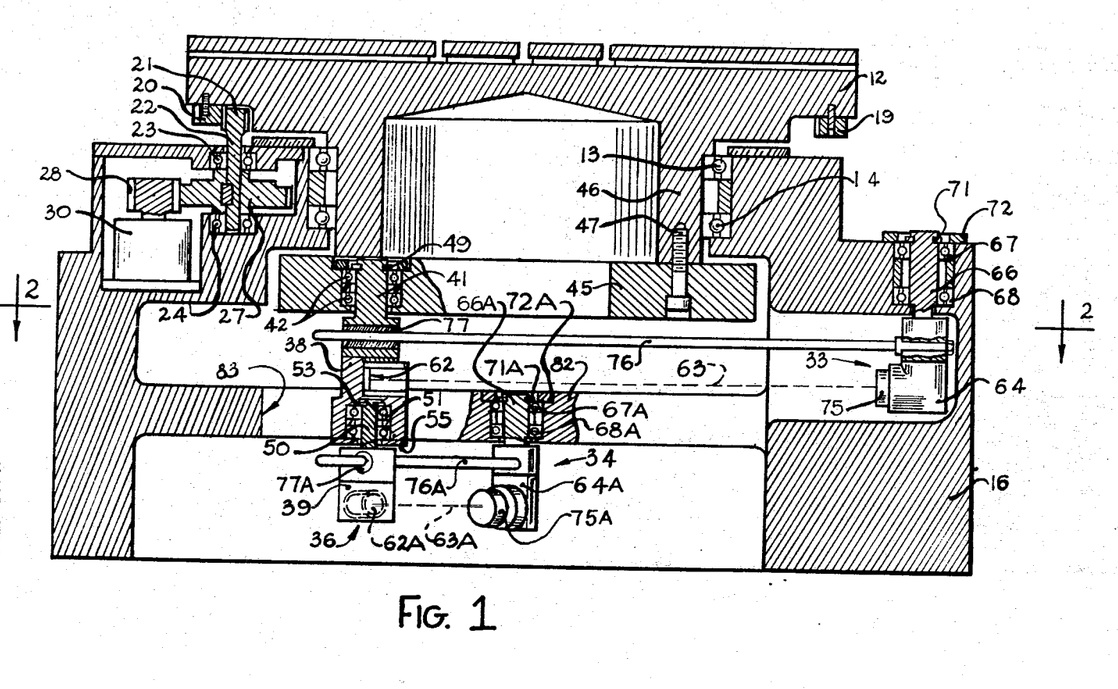
FIG. 1 is a diagrammatic view in vertical section through an index table in combination with an angular interferometric measuring apparatus shown partly in elevation and partly in vertical section.
Figure 2:
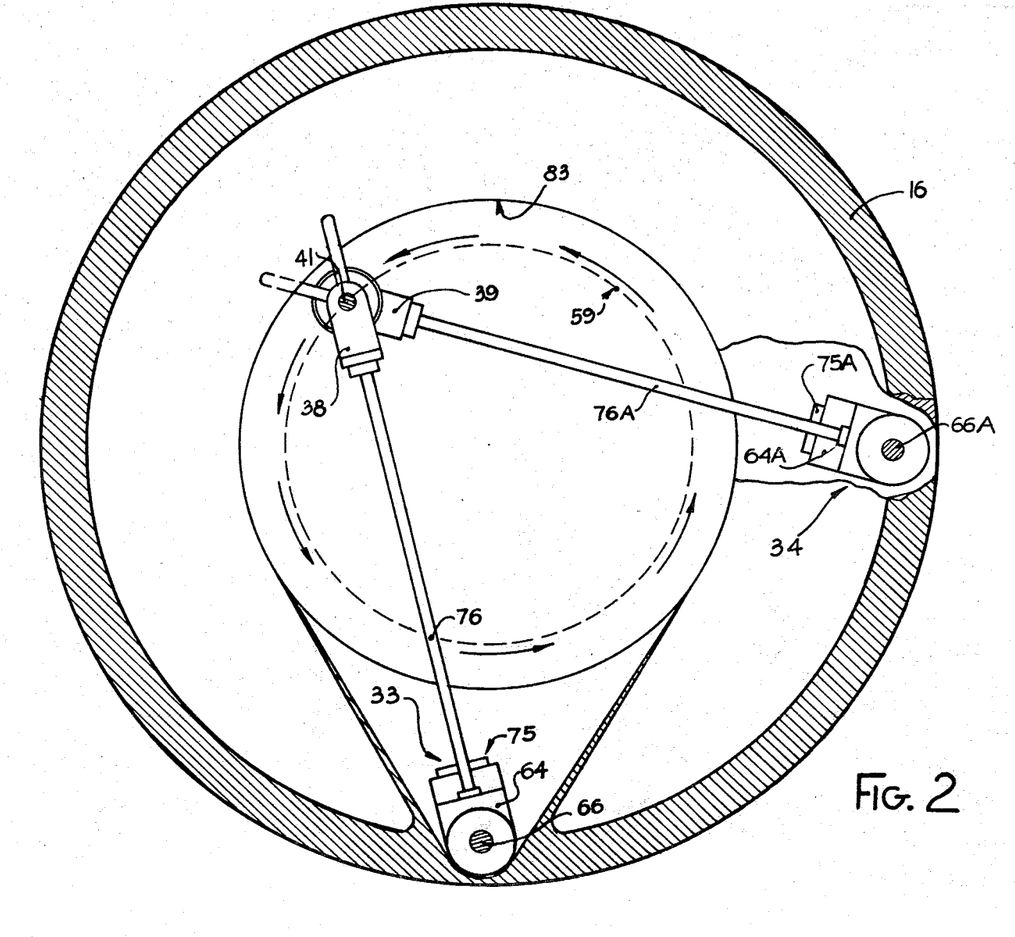
FIG. 2 is a plan view of the angular measuring apparatus taken along a horizontal plane represented generally by the line 2-2 in FIG. 1.

Referring to the drawings and particularly to FIGS. 1 and 2 thereof, an indexable worktable 12 is shown with an interferometric measuring apparatus for measuring angular motion. The worktable 12 is supported for rotational movement in bearings 13 and 14, the outer races of which are carried within a bored opening formed in a machine frame 16 in well-known manner. For supplying indexable driving power, a ring gear 19 is fixedly secured to the underside of the worktable 12 by peripherally spaced screws, such as the screw 20. A pinion 21 engaging the ring gear 19 is integrally formed with a selectively rotatable shaft 22 journaled in vertically spaced bearings 23 and 24 carried in a bored opening formed in the frame 16. A driven gear 27 keyed to the gear shaft 21 is engaged by a drive pinion 28 secured to an output shaft of a flange mounted drive motor 30 fixedly secured to the machine support frame 16.

Preferably, the drive motor 30 is of the servo type operative to indexably rotate the worktable 12 in a selected direction and at a selected rate of movement. Further, as will hereinafter be more fully explained, the motor 30 is controlled by a numerical control system for rotating the worktable 12 to preselected indexed position relative to the supporting machine frame 16.

For measuring indexable movement, a pair of interferometers 33 and 34 are operatively interconnected between spaced apart portions of the frame 16 and a common, depending reference member 36 carried for bodily rotational movement with the worktable 12. The interferometers 33 and 34 comprise cooperating rectilinear measurement systems operative to provide both a visual indication of angular worktable movement, and a positional feedback signal to a numerical control system as will hereinafter be more fully explained.

The common reference member 36 comprises a pair of vertically spaced reflector supports 38 and 39 that are independently pivotal about a coincident axis disposed in parallelism to the rotational axis of the worktable 16. The upper reflector support 38 is formed integrally with an upwardly extending circular shank 41 rotatably supported within a pair of bearings 42. The outer races of the bearings 42 are carried within a vertical bored opening formed in an enlarged circular plate 45 secured to the depending hub 46 of the worktable by peripherally spaced cap screws, such as the screw 47. To retain the support shank 41 in engagement with the bearings 42, an annular groove formed therein is engaged by a snap ring 49 in well-known manner.

The lower reflector support 39 is integrally formed with a circular shank 50 extending upwardly through the inner races of bearings 51, and is secured thereto by a snap ring 53 engaging an annular groove to constitute a unitary assembly. The outer races of bearings 51 are retained within a bored opening in the lower end of the upper pivotal support 38 for rotation about the common, coincident axis. To retain the bearings 51 in the position shown in FIG. 1, a bearing retainer 55 is fixedly secured to the lower end of the upper support 38 in known manner. Both the upper and lower beam reflectors respectively carried by the concentrically pivotal supports 38 and 39 extend through the common axis of rotation. During rotation of the worktable 12 through a full 360°, the concentrically disposed reflector supports 38 and 39 comprising the common reference member 36 traverse a circular path of movement, indicated by the dashed line 59 in FIG. 2, concentric to the axis of the worktable.

A beam reflector 62 carried by the upper support 38 is adapted to receive from and reflectively return a variable length measuring beam 63 to a light projector housing 64 pivotably supported by the frame 16. The beam projecting housing 64 depends from an integrally formed circular shank 66 pivotally supported in bearings 67 and 68. A snap ring 71 engaging an annular groove in the shank 66 retains it in engagement with the bearings 67 and 68 which are secured within a bored opening in the frame 16 by means of a circular bearing retainer 72.

For continuously directing the measuring beam 63 toward the reflector 62, the housing 64 is provided with a tubular beam projector 75 continuously oriented in predetermined angular alinement with the upper support 38. To accomplish this, a steering rod 76 fixedly secured at its outer end to the housing 64 extends inwardly to slidably engage a tubular bearing 77 in the pivotal reflector support 38. During rotational movement of the worktable 12, the upper reflector support 38 pivots in the bearings 42 due to its telescoping engagement with the rod 76, thus continuously maintaining the reflector 62 in predetermined angular alinement with the tubular beam projector 75. During rotational movement of the worktable 12, it will be apparent that both the light projecting housing 64 is pivoting about its axis at the same time the cooperating reflector support 38 is pivoted a full 360° about its axis due to the rod 76 telescopingly interconnected therebetween.

The interferometer 34 is operative in a similar manner to continuously direct a variable length measuring beam 63A from a tubular beam projector 75A formed with a pivotable housing 64A toward a beam reflector 62A. Except for inclusion of the suffix A in the reference numerals, the various parts shown as comprising the interferometer 34 are identical to corresponding parts in the interferometer 33 and function in like manner. As shown in FIGS. 1 and 2, the respective pivot axes of the beam projector housings 64 and 64A are spaced apart 90° with respect to the rotational axis of the worktable 12. As shown in FIG. 1, the light beam projector housing 64A is rotatably supported by a transverse web 82 integrally formed with the frame 16. The transverse frame web 82 is provided with an enlarged circular opening 83 to permit rotational movement of the depending, common reference member 36 during rotary movement of the worktable 12. During rotational movement of the worktable 12 throughout one complete revolution, the lower reflector support 39 is pivoted 360° about its axis due to the telescoping movement of the rod 76A secured to the simultaneously pivoting interferometer housing 64A. During rotational movement of the worktable 12, therefore, the respective rectilinear measuring beams 63 and 63A are continuously changing in length as the common reference member 36 is rotated through a like rotational path of movement.

Figure 3:
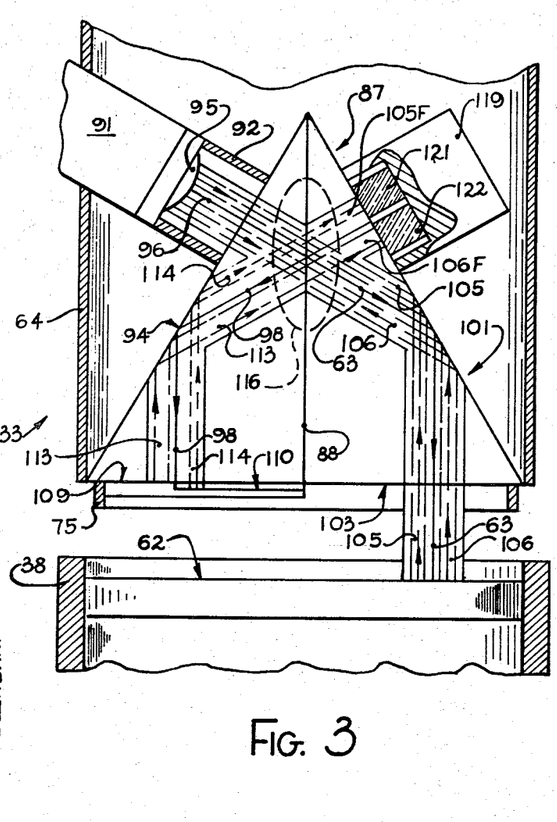
FIGS. 3 and 3A are respectively schematic views of the pair of separate interferometers comprising the angular measuring apparatus illustrated in FIGS. 1 and 2.
Figure 3A:
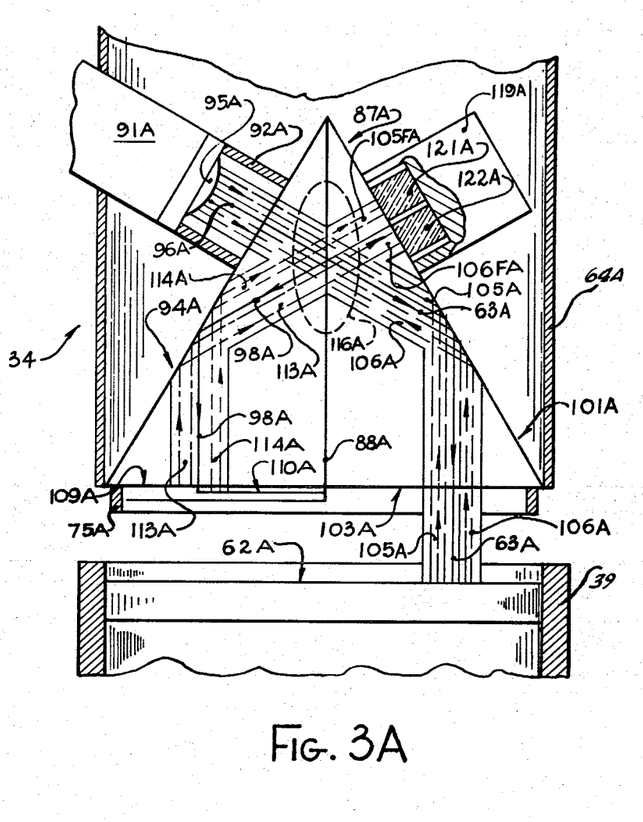

In FIGS. 3 and 3A, there are represented enlarged diagrammatic illustrations of the optical arrangements for the cooperatively disposed interferometers 33 and 34. Inasmuch as the interferometers function in like manner, identical reference numerals have been applied to identify corresponding parts in each of them, excepting that the suffix A is included on corresponding parts in FIG. 3A. In view of the similarity of operation, it is deemed necessary to describe in detail only the interferometer 33 in FIG. 3. As there shown, a unitary prismatic element 87 is adhesively secured within the beam projecting housing 64. Preferably, the prismatic element 87 is a modified form of Koesters prism having a semitransparent interface 88 positioned in perpendicular relationship to the base thereof in a manner to act as a beam splitter for dividing an entrant light beam into two divergent beams and for recombining the split beams. In other words, one-half of an entrant light beam is angularly reflected by the interface 88, and the other half of the entrant light beam is transmitted through the interface 88.

A light source, preferably a laser 91, is mounted within the housing 64 and is secured to one angular face 94 of the prismatic element 87 by a tubular spacer 92. As shown in FIG. 3, the laser 91 is provided with a collimating lens 95 adapted to project an intense, coherent beam 96 of collimated light through a transparent portion of the angular prism face 94 to the interface 88 which functions as a beam splitter to divide the input beam 96 into a fixed length reference beam 98 and the variable length measuring beam 63. For simplicity, 63 is directed to the axis of the measuring beam transmitted through the interface 88 and which is identified as being directed toward an internal reflective portion of the angular prism face 101. The measuring beam is then reflected outwardly through a transparent base portion 103 of the unitary element 87 toward the reflector 62 carried by the pivotal support 38. From the movable reflector 62, the reference beam is then coincidentally returned along the same path, being again reflected by the internal angular reflective prism face toward the interface 88 thereof. From the movable reflector 62, the coincidental return beam is identified as comprising the two adjacent beam portions 195 and 106 for recombining with the phase differentiated, returned wave fronts of the reference beam 98.

At he same time, the other half of the split beam 98 is angularly reflected from the semitransparent interface 88, and then reflected downwardly by an internal reflective surface presented by the angular prism face 94. The reference beam 98 continues toward adjacent, stepped internal reflective surfaces 109 and 110 integrally formed with the prismatic element 87. As a result, there are coincidentally returned by the adjacent reflective surfaces 109 and 110, two adjacent phase differentiated reference beam portions 113 and 114. The adjacent, returned beam portions 113 and 114 are next reflected by internal reflective surface of the angular prism face 94 and directed toward the semitransparent interface 88 as two phase differentiated wave fronts.

As shown in FIG. 3, the phase differentiated wave fronts of returned reference beam portions 113 and 114 are combined with the returned measuring beam portions 105 and 106 at the recombining portion of the interface 88 to provide interference patterns or light fringes identified as 105F and 106F. As schematically indicated in FIG. 3, the semitransparent interface 88 is provided with a coincidentally disposed "unitary beam splitting and recombining portion" 116. That portion 116 of the interface thus is operative to recombine the respective wave fronts of the fixed length reference beam and the measuring beam to provide the interference fringes 105F and 106F which operate photodetector means 119. The interference fringes 105F and 106F are transmitted through a transparent portion of the angular prism face 101 in a manner to directly and respectively activate separate solid state, photodetectors 121 and 122 comprising the photodetectr means 119. Output from the photodetectors 121 and 122 comprises two electrical signals, 90° out of phase, corresponding to the frequency generated by the phase displaced, separate sets of interference fringes. All of the beam entrance and exit paths of the prismatic element 87 are provided with antireflective coatings (not shown) rendering those portions light transmissive. In particular, completely light transmissive paths are provided in those prism faces for the entrant light beam 96, for the exit and return measuring beam 63, and for the exit path for the interference fringes 105F and 106F.

With the simplified diagrammatic form of measuring instrument illustrated in FIG. 3, light interference fringes at the recombining portion 116 are indicative of the relative rectilinear movement between the projector housing 64 and the cooperating reflector support 38. It will be apparent that the cyclical variation of the interference fringes 105F and 106F is a function of the difference in the optical beam path lengths respectively traversed by the internal reference beam and the variable length measuring beam. As hereinbefore explained, the interferometer 34 diagrammatically illustrated in FIG. 3A operates in like manner to that illustrated in FIG. 3.

It will be readily apparent that other types of rectilinear measuring devices can be utilized in lieu of the interferometers 33 and 34, and in a similar manner, without departing from the spirit of the present invention. Likewise, other types of interferometers of the well-known Michelson type may be used in place of the interferometers 33 and 34 described in the present invention. As hereinbefore explained, the light source is preferably the laser 91 adapted to supply an intense, well collimated coherent beam of monochromatic light 96. However, the optical configuration of the interferometers 33 and 34 illustrated in FIGS. 3 and 3A is disposed to be equally effective for any equivalent, intense light source. As known in the art, the word "laser" is an acronym for the complete descriptive phrase "light amplification by stimulated emission of radiation". For illustrative purposes, the laser light source 91 is schematically shown in a longitudinal sectional view, FIG. 4, and is provided with a discharge or plasma tube 127 supported within the housing 128. At its opposite ends, the plasma tube 127 is provided with optical flat surfaced windows 130 and 131 integraly formed therewith and angularly inclined at Brewster's angle.

Figure 4:
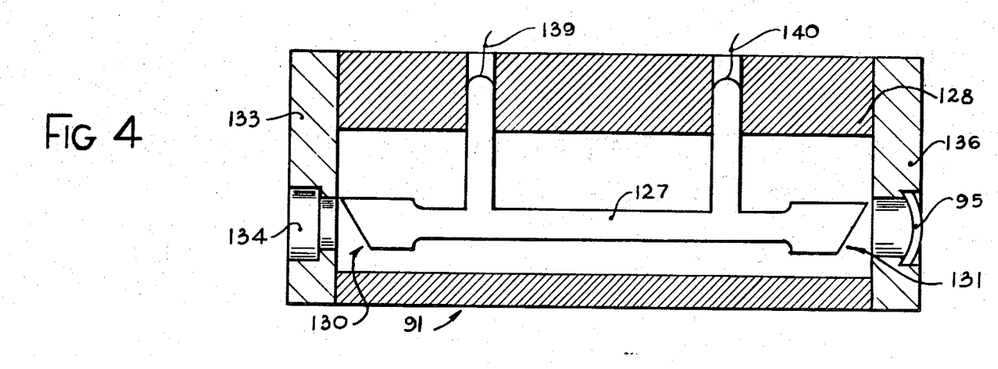
FIG. 4 is a fragmentary view in vertical section through a continuous laser illustrative of an exemplifying light source for each of the interferometers comprising the angular measuring apparatus.

The housing end bracket 133 is disposed to support a plane mirror or "end reflector" 134 at the rearward end of the tube 127. At its forward end, the housing end bracket 136 supports the combined spherically formed reflector and collimating lens 95. The discharge tube 127 contains helium and neon which is raised to excited energy levels by current applied to input conductors 139 and 140 from an appropriate source of electrical energy in well-known manner. As this occurs, light is reflected back and forth between the flat end reflector 134 and the slightly less reflective spherical reflector 95. These light waves continue to travel back and forth until a coherent, monochromatic beam of light is emitted by the spherical reflector 95, then functioning as a collimating lens. Preferably, the laser 91 is a single mode, continuous helium-neon gas laser operating at a wave length of 6328 Angstrom units that is adapted to emit a linearly polarized light beam.

Figure 4A:
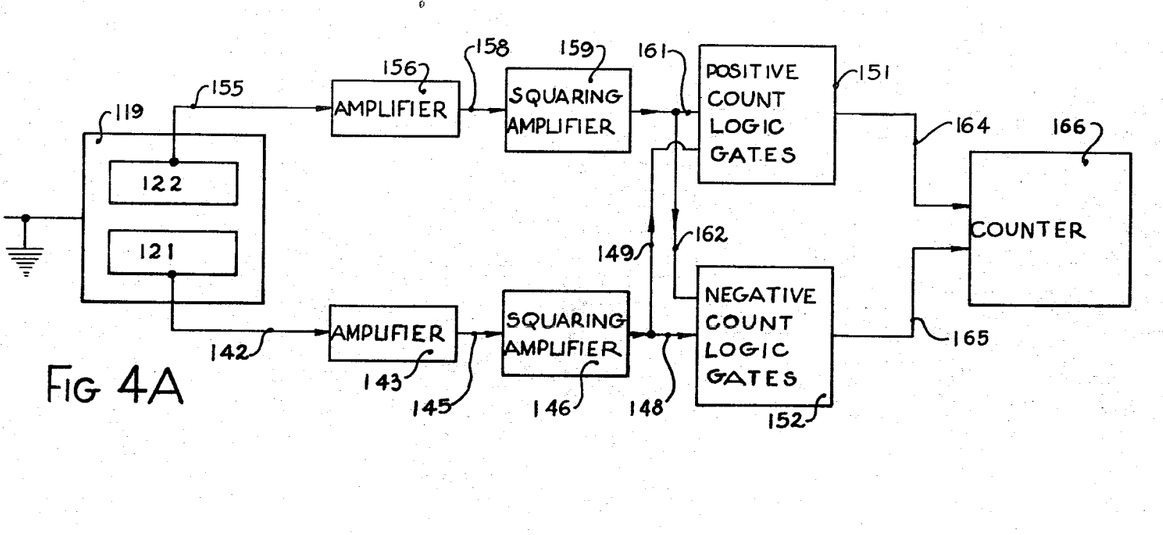
FIG. 4A is a block diagram schematically illustrating the output from the photodetectors of each interferometer for activating a fringe counter.

A simplified form of fringe counting circuit responsive to be interferometer photodetector means 119 is schematically illustrated in FIG. 4A. From the photodetector 121, one signal is transmitted along a conductor 142 to an amplifier 143, and thence via a line 145 to a squaring amplifier 146; this one circuit continues via lines 148 and 149 respectively to branch circuits 151 and 152 respectively disposed to function as positive and negative count logic gates.

A quadrature spaced electrical signal from the other photodetector 122 is transmitted via a line 155, to an amplifier 156 and then via a line 158 to actuate a squaring amplifier 159 connected via conductors 161 and 162 to actuate the circuits 151 and 152 comprising the negative and positive count gates. Signals are then transmitted via conductors 164 and 165 connected to actuate a fringe counter for indicating the extent of relative movement. Although not shown, another fringe counting circuit identical to that illustrated in FIG. 4A is connected to be activated by the photodetectors and illustrated and hereinbefore described with reference to the interferometer of FIG. 3A.

Figure 5:
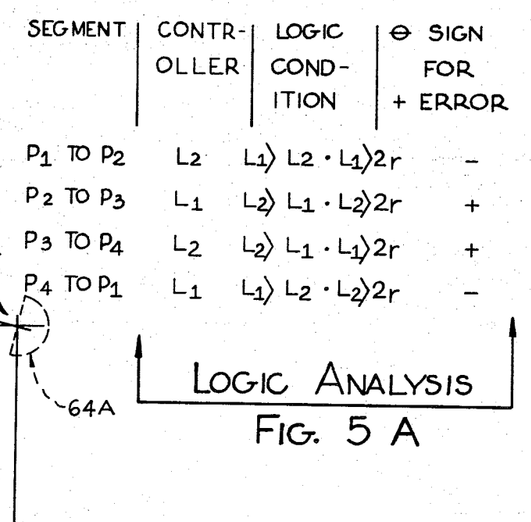
FIG. 5 is an enlarged line diagram illustrating the logic and arithmetical relationship of the two angle measuring interferometers.

In FIG. 5 there is illustrated a line diagram directed to the logic relationship of the beam measuring interferometers 33 and 34 during rotational movement of the worktable 12 about its rotational axis 170. As hereinbefore explained, the common reference member 36, FIG. 1 and 5, is provided with concentrically pivotal reflectors individually cooperable with the separate light beams 63 and 63A respectively projected by pivotal, beam projector housings 64 and 64A of interferometers 33 and 34. During rotational table movement, the depending common reference member 36 traverses a corresponding rotational path 59, FIG. 5, relative to the simultaneously pivoting, interferometer projector housings 64 and 64A about their stationary pivot axes in the stationary support frame 16.

The common pivot axis of reference member 36 is spaced from the table axis 170 a distance indicated as $r$ in FIG. 5. Further, the respective pivot axes of the projector housings 64 and 64A are each spaced from the table axis 170 a distance indicated as $2r$. The respective distances $r$ and $2r$ are selected for convenience to illustrate the various relationships; however, any other convenient predetermined distances could be used. For simplicity in explaining the Logic Analysis of FIG. 3A, the measuring beam 63 is designated at Controller $L_1$, and the variable length measuring beam 63A is designated as Controller $L_2$. Those points spaced 45° or midway between the principal 90° divisions of the 360° circular reference member path 59 are designated P1, P2, P3 and P4 for convenience in designated four different arcs of worktable movement. The table rotation angle $\Theta$ in FIG. 5 is represented in accordance with convention as being positive, rotation being counter-clockwise as illustrated by the arcuate arrow designations along the path 59.

According to the Logic Analysis table of FIG. 5A, it will be apparent that the measuring beam Controller $L_2$ of interferometer 34 will predominate in controlling angular motion through arcuate segments $P_1$ to $P_2$ and $P_3$ to $P_4$ respectively. Likewise, the measuring beam Controller $L_1$ of interferometer 33 predominates in controlling motion throughout arcuate segments $P_2$ to $P_3$ and $P_4$ to $P_1$ respectively. One reason for arc segment assignment to the measuring beam of a particular interferometer is to take advantage of the highest rate of change of the distance L with respect to the angle of table rotation $\Theta$. Since it is also necessary to obtain $\Theta$ directional information for the correction of indicated errors, the Logic Analysis table of FIG. 5A is obvious from inspection of the diagram of FIG. 5. In spite of the fact that $L_1$ equals $L_2$ at points $P_2$ and $P_4$, this apparent ambiguity is not significant in view of the logic of the control circuit.

Referring again to the logic analysis table of FIG. 5A, the following relationships exist:

$$L_1^2 = (r \cos \theta)^2 + (2r + r \sin \theta)^2$$
$$L_2^2 = (r \sin \theta)^2 + (2r - r \cos \theta)^2$$

After expanding, collecting and simplifying ($\sin^2 \Theta + \cos^2 \Theta = 1$), the relationships are:

$$L_1^2 = r^2(5 + 4 \sin \theta)$$
$$L_2^2 = r^2(5 - 4 \cos \theta)$$

Figure 6:
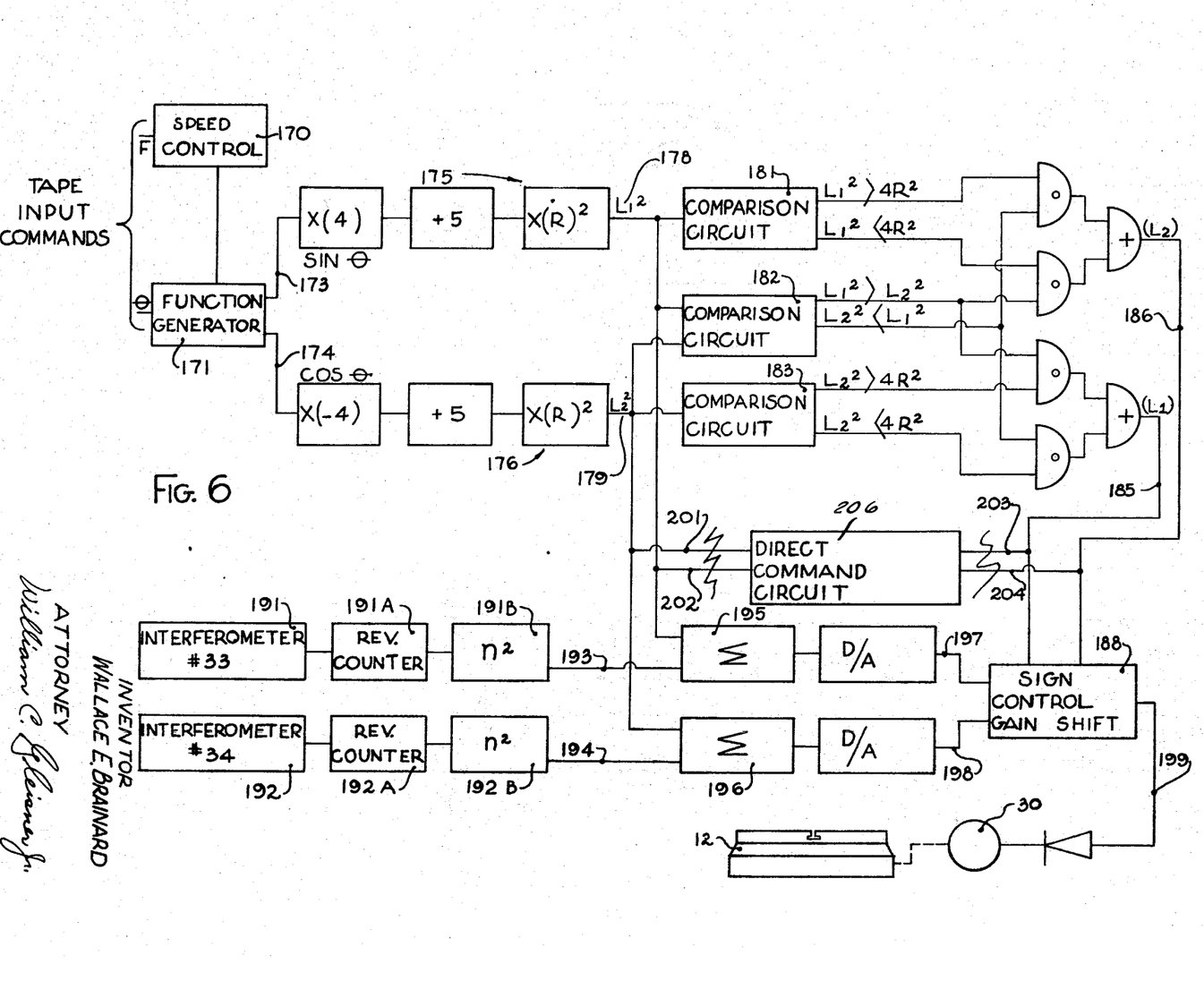

In FIG. 6, there is illustrated a simplified block diagram of a control circuit for executing the arithmetical and logic operations required to compare the desired angle $\Theta$ with rectilinear distances measured by Controllers $L_1$ and $L_2$. The difference between the input command and angle $\Theta$ and the measured distances $L_1$ and $L_2$ provide command signals for operating the motor 30 to rotate the table 12 to a selected angular position.

As shown in FIG. 6, numerical control data is provided by punched tape to provide input commands to a speed control circuit 170 and function generator 171 respectively. The function generator 171 is adapted to produce a digital output corresponding to the instantaneous value of $L_1$ and $L_2$, for the sine and cosine functions of the command angle $\Theta$. The speed control circuit 170 provides a digital pulse stream, the rate of which corresponds to the preselected rate of the worktable; and serves to command the rate of $\Theta$ function generation, thus allowing control of a continuously varying angle as well as of discrete position commands. It will be apparent, therefore, that the speed control circuit 170 provides for either discrete positional or continuous contouring control. From the function generator 171, command data is transmitted via lines 173 and 174 to separately interconnected logic circuits respectively associated with Controllers $L_1$ and $L_2$ as indicated. The output therefrom is transmitted via lines 178 and 179 to comparison circuits 181, 182 and 183.

From the comparison circuits, command signals are then transmitted to conductors 185 and 186 associated with Controllers $L_1$ and $L_2$ for determining which controller predominates and supplies the necessary commands to the circuit 188 for the Sign Control Gain Shift. At the same time, positional feedback control signals from the circuits 191 and 192 for the interferometers 33 and 34 are transmitted to revolution counting circuits 191A and 192A, the output numbers of which are squared in circuits 191B and 192B; the output from which are then transmitted via lines 193 and 194 to respective summing angle control circuits 195 and 196, respectively interconnected to receive signals from the respective comparison circuits as shown. Positional requirements for angular worktable movement are then transmitted via lines 197 and 198 to the Sign Control Gain Shift circuit. Command control signals are transmitted therefrom via a schematically indicated control line 199 for effecting servocontrolled operation of the motor 30 to move the worktable 12 to the selected angular position.

With the comparison circuitry associated with the speed control circuit 170 and function generator 171 disconnected, complete command data can be transmitted from a command circuit 206 via conductors 201, 202, 203 and 204 as indicated. In the latter case, data from the command circuit 206 comprises the results of computations derived from a general purpose computer for providing the necessary command values of $L_1$ and $L_2$ via lines 201 and 202, as well as the sign control values via lines 203 and 204. The required data from the command circuit 206 directly supplies positional command signals with the feedback circuits for indicating existing angular table positions being provided from the interferometer feedback circuits 191 and 192. It will be apparent that disconnect switching may be provided to disconnect the input command lines from the comparison circuits 181, 182 and 183 whenever more complete control data is supplied from the direct tape command circuit 206. Conversely, disconnect switching may be used to disconnect the tape command circuit 206 whenever the comparison circuits 181, 182 and 183 are operating to effect positional movement.

Referring again to FIG. 6, it will be noted that the "pull" or gain of the position feedback loop depends upon the instantaneous rate of change of measuring beam Controllers $L_1$ and $L_2$. The maximum gain will occur at the points of tangency of $L_1$ and $L_2$ with the circular path 59, FIG. 5.

Although the radial offset of the pivot axes of interferometer projectors 64 and 64A from the table axis are illustrated in FIG. 5 as being $2r$, this offset can be any other convenient distance with appropriate modification of equations and logic. Thus, it is possible to sum a part of the gain of the noncontrolling interferometer with that of the controlling interferometer. The exact rates to be used will depend upon the offset distances; gain switching can be accomplished in the sign control shift circuit 188 shown in FIG. 6.

From the foregoing detailed explanation of the operation of the exemplifying interferometric measuring control system, it will appear that there has been provided a greatly improved and more accurate positioning control for an indexable member.

Although the illustrative embodiments of the invention have been described in considerable detail for the purpose of fully disclosing an operative structure by means of which the invention may be practiced, it is to be understood that the particular apparatus herein described is intended to be illustrative only and that the various novel characteristics of the invention may be incorporated in other structural forms without departing from the spirit and scope of the invention as defined in the subjoined claims.

I claim:
1. In a measuring apparatus having:
   a support frame;
   a table rotatably journaled on said frame for selective pivotal movement about its axis;
   a pair of reference reflectors pivotally secured to said table for rotation about an axis parallel to the table axis and spaced radially therefrom;
   a pair of spaced apart beam projecting interferometers pivotally carried by said frame for rotation about spaced apart axes parallel to the rotational table axis and spaced radially therefrom a distance greater than the radial spacing of the reflector pivot axis; said interferometers being adapted to project separate measuring light beams toward said reflectors and receive reflectively returned beams therefrom for combining with reference beams to provide interference fringes indicating the rectilinear distances between said interferometers and said respectively associated reflectors;
   means interconnected between said interferometers and said associated reflectors for maintaining the proper beam measuring relationship therebetween irrespective of the pivotal adjustment of said table relative to said frame; and
   a measuring circuit responsive to interference fringes from said interferometers for indicating the rectilinear distance relative to said respectively associated reflectors and the pivotal movement of said table relative to said support frame.

2. A measurement apparatus according to claim 1 characterized by a servomotor connected to rotate said table to a selected position;
   a numerical control system including input means for actuating said servomotor for moving said table to a preselected angular position; and
   positional feedback control means responsive to said measuring circuit for indicating the pivotal movement of said table and cooperable with said positional input means for stopping said servomotor upon arrival of said table in the position selected by said numerical control system.

3. In an angular measurement apparatus having:
   a frame;
   a table pivotally journaled on said frame for selective rotatable movement and presenting a reference member radially spaced from the pivot axis thereof for rotational movement with said table;
   a pair of laterally spaced apart cooperating members fixedly carried by said frame and being both spaced radially from the pivot axis of said table a distance greater than the radial spacing of said reference member therefrom; and
   a pair of separate rectilinear measuring devices operatively disposed to measure the distance between said reference member and both of said cooperating frame members for indicating the extent of angular movement of said table about its pivot axis and relative to said frame.

4. An angular measurement apparatus according to claim 3 including:
   feedback control system predeterminately responsive to said rectilinear measuring devices for predetermined portions of angular movement of said table;
   a numerical data control system operative to provide signals for moving said table to a predetermined position; and
   a servodrive motor operative to move said table a distance corresponding to the difference between the angular position required by said numerical data control system and the existing angular position indicated by said feedback control system.

5. In an angular measurement apparatus having:
   a support frame;
   a table journaled to pivot on said frame for selective rotatable movement;
   a pair of reference members respectively journaled on said frame and said table for rotation about different pivot axes both parallel to the table pivot axis and respectively spaced different radial distances therefrom;
   an interferometric measuring instrument comprising a light beam projector carried by one of said members and a cooperating beam reflector carried by the other of said members, said interferometric instrument being operative to provide interference fringes indicating relative rectilinear movement between said reference members; and
   a mechanical interconnection between said pivotable reference members for continuously maintaining said beam projector and said cooperating reflector in predetermined operative alinement during rotatable movement of said table.

6. In an angular measurement apparatus according to claim 5 including a second pair of reference members respectively journaled on said frame and said table with the second reference member on said table being journaled to rotate about an axis coincident with the axis of said first reference member journaled thereon, said second reference member on said frame being journaled about an axis spaced apart from the axis of said first reference member journaled thereon, an interferometric measuring instrument comprising a light beam projector carried by one of said second reference members and a cooperating light beam reflector carried by the other of said second reference members, a position indicating control circuit responsive to said interferometric measuring instruments for determining the angular position of said table relative to said frame, and means associated with said position indicating control circuit operative to render said circuit primarily responsive to one of said instruments during a predetermined portion of angular movement of said table and primarily responsive to the other of said instruments during another predetermined portion of angular movement of said table.

7. In a machine having:
a frame;
a table rotatably supported by said frame for selective pivotal movement and presenting a common reference member radially spaced a predetermined distance from the rotational axis thereof for rotational movement therewith, a pair of measuring instruments carried by said frame in angularly spaced relationship to one another and in radially outward spaced relationship to the axis of said table;
said measuring instruments being simultaneously operative to independently measure the respective lineal distances to said common reference member presented by said rotary table during rotational movement thereof;
a power drive connected to effect selective rotary movement of said table; and
a source of command data including a control circuit operative to actuate said power drive for effecting selective rotational movement of said table in accordance with the input command signals therefrom compared with the measurement signals from said instruments.

8. A machine according to claim 7 characterized by said common reference member comprising light reflective means cooperable with said measuring instruments, and said pair of measuring instruments comprising separate interferometric light projectors operative to project separate light beams toward said light reflective means and receive therefrom reflectively returned measuring beams, and means for combining the returned beams with reference beams to provide interference fringes indicative of the respective rectilinear distances between said light projectors and said cooperating reflectors.

9. A machine according to claims 7 characterized by signals from said measuring instruments representing the sine and cosine functions of an angle representing the angularly pivoted position of said table, a control circuit responsive to the sine and cosine function signals from said measuring instruments continuously operative to provide a position indicating feedback control signal indicative of the angular position of said table during pivotable movement thereof.

10. In an angular measurement apparatus having:
a support frame;
a table rotataby journaled on said frame;
a first pair of reference members respectively journaled on said frame and said table for rotation about different pivot axes;
a second pair of reference members respectively journaled on said frame and said table, said second reference member on said table being journaled to rotate about an axis coincidental with the axis of said first reference member and said second reference member on said frame being angularly spaced from said first member journaled thereon;

a first interferometric measuring instrument comprising a light beam projector carried by one of said first pair of members and a cooperating beam reflector carried by the other of said first pair of members; and
a second interferometric measuring instrument comprising a light beam projector carried by one of said second pair of reference members and a cooperating beam reflector carried by the other of said second pair of members said interferometric instruments being operative to provide interference fringes respectively disposed to indicate the relative rectilinear movement between said first pair of reference members and said second pair of reference members for indicating the angular movement of said table relative to said frame.

11. In an angular measurement apparatus according to claim 10 including:
separate mechanical means respectively interconnected between said first pair of reference members and between said second pair of reference members for continuously maintaining both associated pairs of reference members in predetermined alinement during pivotal movement of said table;
a position control responsive to said interferometric instruments and being presettable for moving said table to predetermined position; and
a power drive connected to rotate said table to predetermined rotary position in accordance with the preset operation of said position control.

12. In a measurement apparatus having:
a frame;
a worktable journaled on said frame for selective movement;
a cooperating common reference member carried by said worktable and being radially spaced from the axis thereof for rotational movement therewith;
a pair of separate angularly spaced cooperating members both carried by said frame in predetermined radially spaced relationship to said common reference member carried by said worktable;
a pair of separate rectilinear measuring instruments respectively connected at one end to said separate frame reference members and extending radially inward for operative connection at their opposite ends to said common reference member carried by said worktable; and
power operable control means predeterminately controlled by coordinate operation of said measuring instruments for effecting selected pivotal movement of said worktable.

13. In an angular measurement apparatus having: a support frame;
a table pivotally carried by said frame;
a laterally offset table reference member secured to said table for pivotal movement therewith;
a pair of angularly spaced-apart members secured to said frame in predetermined radial relationship to said table reference member; and
separate measuring means respectively connected to measure the respective rectilinear distances between said table reference member and said separate spaced-apart fixed frame members secured to said frame during pivotal movement of said table and being coordinately operable to control pivotal movement of said table.

14. In a measuring apparatus according to claim 13 including a servomotor connected to pivot said table to a selected angular position relative to said frame in accordance with the position selected by coordinate operation of said separate measuring means.